United States Patent [19]

Sharp

[11] Patent Number: 5,632,289

[45] Date of Patent: May 27, 1997

[54] POWDER DISPENSING VIBRATING GROOMING APPARATUS

[75] Inventor: Steve R. Sharp, Fort McMurray, Canada

[73] Assignee: Okanagan House Inc., Penticton, Canada

[21] Appl. No.: 533,873

[22] Filed: Sep. 26, 1995

[51] Int. Cl.$^6$ .................................................. A45D 24/22
[52] U.S. Cl. .................. 132/116; 132/120; 132/119.1; 132/148; 132/147; 132/306; 132/313
[58] Field of Search .................. 132/219, 119.1, 132/148, 120, 147, 116, 306, 307, 313; 119/602, 605; 15/22.1, 22.2

[56] References Cited

U.S. PATENT DOCUMENTS

| | | | |
|---|---|---|---|
| 1,553,456 | 9/1925 | Metrakos | 15/22.1 |
| 1,818,281 | 8/1931 | Soss | 15/22.1 |
| 3,346,748 | 10/1967 | McNair | 15/22.1 |
| 3,358,309 | 12/1967 | Richardson | 15/22.1 |
| 3,393,686 | 7/1968 | Goble | 132/7 |
| 3,466,689 | 9/1969 | Aurelio | 15/22 |
| 3,840,030 | 10/1974 | Baker | 132/9 |
| 3,870,056 | 3/1975 | Stemme | 132/11 A |
| 3,942,538 | 3/1976 | Deppeler | 132/11 R |
| 4,027,348 | 6/1977 | Flowers et al. | 15/22.1 |
| 4,044,724 | 8/1977 | Merchill | 119/605 |
| 4,991,249 | 2/1991 | Suroff | 15/22.2 |
| 5,072,746 | 12/1991 | Kantor | 132/219 |
| 5,297,512 | 3/1994 | Sharp | 119/86 |
| 5,365,880 | 11/1994 | South | 132/116 |

FOREIGN PATENT DOCUMENTS

| | | |
|---|---|---|
| 371501A3 | 6/1990 | European Pat. Off. . |
| 3222905 | 12/1991 | Japan . |
| 1456516 | 11/1976 | United Kingdom ............... 132/119.1 |

*Primary Examiner*—Gene Mancene
*Assistant Examiner*—Pedro Philogene
*Attorney, Agent, or Firm*—Shlesinger, Arkwright & Garvey, L.L.P.

[57] ABSTRACT

An apparatus for grooming hair includes a hairbrush having a plurality of tines, a container for containing particulate matter, a vibrator for vibrating the hairbrush and an opening in the container, proximate to the tines, for dispensing the particulate matter amongst the tines when the hairbrush is vibrated.

8 Claims, 3 Drawing Sheets

POWDER DISPENSING VIBRATING GROOMING APPARATUS

BACKGROUND OF THE INVENTION

This invention relates to grooming devices for hair, in particular for the hair or fur of an animal, such as a cat, dog, or horse.

Various powders exist for repelling fleas and the like from fur bearing animals. Such powders include flea powders. In applying such powders to an animal, one must take care to fluff the animal's fur to ensure the powder penetrates deep into the fur to reach the skin. Conventional methods of dispensing flea powder involve dusting powder onto the outer surface of the fur and stroking the fur back and forth, fore and against the natural lay of the fur to provide sufficient separation of the fur to permit penetration of the powder. This, at best, results in the powder being distributed unevenly about the animal and presents the risk of excessive accumulation of powder in some areas. This can cause irritation of the animal's skin, resulting in discomfort.

What would be desirable therefore is a device which more evenly distributes flea powder onto an animal. The present invention addresses this need.

SUMMARY OF THE INVENTION

In accordance with one aspect of the invention, there is provided an apparatus for grooming hair including a hairbrush having a plurality of tines, a container for containing particulate matter, a vibrator for vibrating the hairbrush and an opening in the container, proximate to the tines, for dispensing the particulate matter amongst the tines when the hairbrush is vibrated.

Preferably the apparatus includes a handle portion, the vibrator being located in the handle portion.

Preferably, the container includes a rigid member having a tine mounting portion for mounting the tines to the rigid member and a handle mounting portion for connecting the handle portion to the rigid member, the tine mounting portion and the handle mounting portion being disposed on opposite sides of the rigid member.

Preferably, the handle mounting portion includes a tapered wall portion for cooperating with the handle portion to removably secure the handle portion to the rigid member.

Preferably, the hairbrush includes a resilient flexible sheet member having first and second surfaces disposed on opposite sides of the sheet member, the tines being connected tot he sheet member to project generally at right angles to the first surface. Preferably, the tine mounting portion includes a holder for holding a perimeter edge of the sheet member such that the first surface is convexly shaped and the second surface is concavely shaped.

Preferably, the rigid member has a wall portion disposed opposite and spaced apart from the second surface, the container being defined between the second surface and the wall portion. Preferably, the opening is disposed in the sheet member, between a plurality of the tines.

Preferably, the wall portion is rigid and has a fill opening for receiving the particulate matter and a plug for sealing the fill opening to prevent the particulate matter from passing through the opening when the hairbrush is vibrated.

Preferably, the vibrator includes rotating means for rotating an object about an axis, the object having an uneven distribution of weight about the axis. The means for rotating may include a motor mounted to the second face side of the member, the motor having a rotatable shaft rotatable about an axis of rotation. Preferably the rotating means further includes a weight mounted to the shaft in a position displaced from the axis of rotation.

BRIEF DESCRIPTION OF THE DRAWINGS

In drawings which illustrate embodiments of the invention.

DETAILED DESCRIPTION

Figure 1:
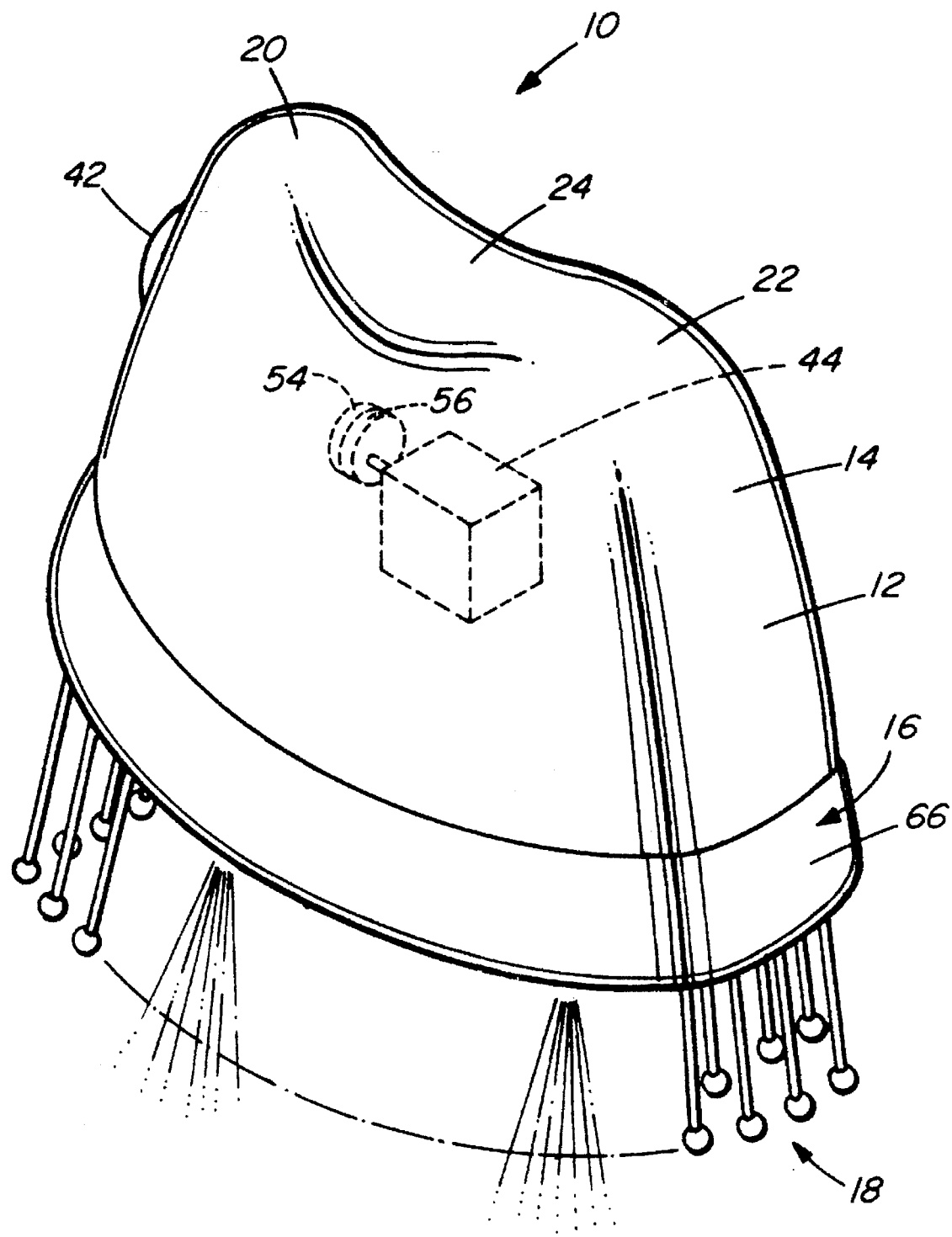
FIG. 1 is an oblique view of an apparatus according to a first embodiment of the invention.

Referring to FIG. 1, an apparatus for grooming hair, according to a first embodiment of the invention is shown generally at 10. The apparatus includes a hairbrush 12 having a handle portion, 14 a container portion 16 and a plurality of tines 18.

The handle portion 14 is formed from moulded plastic and has an outer, smoothly curved "tooth" shape having first and second raised portions 20 and 22 with a valley portion 24 therebetween to facilitate easy and comfortable gripping of the handle portion by a user of the apparatus.

Figure 2:
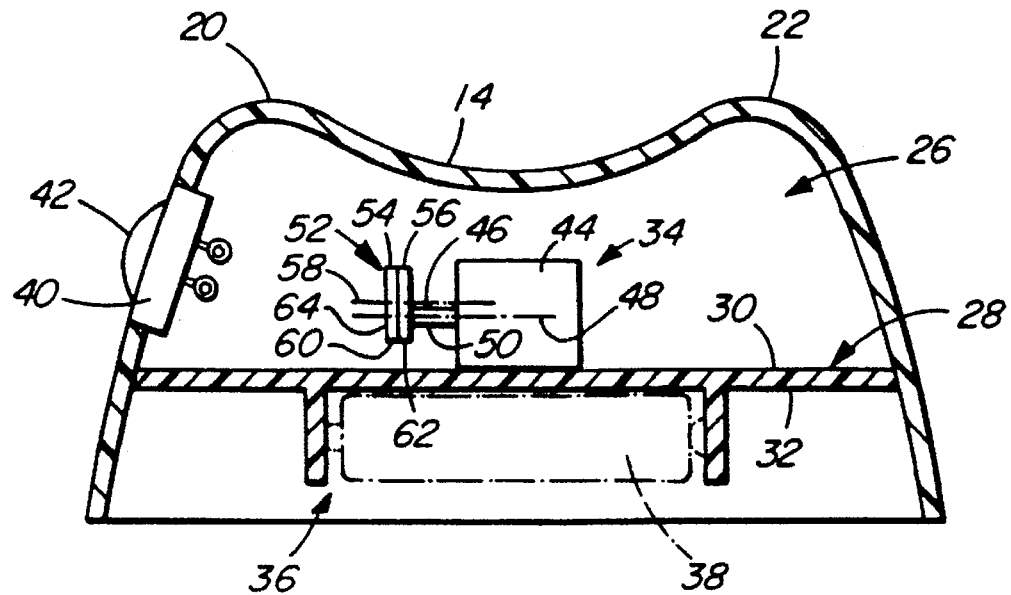
FIG. 2 is a cross sectional view of a handle portion of the apparatus shown in FIG. 1.

Referring to FIG. 2, the handle portion 14 has a cavity 26 accessible from an underside thereof. A platform 28 is mounted inside the cavity, the platform having first and second opposite side surfaces 30 and 32. To the first side surface is mounted an electric powered vibrator shown generally at 34, and to the second side surface is mounted a battery holder shown generally at 36 for holding batteries 38 operable to power the vibrator. The vibrator 34 is thus located in the handle portion 14.

A slide switch 40 is mounted to the handle portion 14 and has an actuator 42 accessible on a side of the first raised portion 20 for easy operation by a finger of a user of the device. The slide switch 40 is operable to interrupt electric power to the vibrator 34 and thereby controls the operation thereof.

The vibrator 34 includes a nominally rated 3-Volt DC motor 44 operable within a voltage range of 1.5 to 3 Volts and having a corresponding RPM range of between 700 and 1200 RPM. The motor has a shaft 46 having an axis of rotation 48. The shaft 46 has an end portion 50 to which is connected a weight 52, the weight being displaced from the axis of rotation 48 such that an uneven distribution of weight is secured to the shaft 46.

In the present embodiment, the weight is provided by a solid cylindrical member 54 which is mounted to the shaft 46 such that an axis 58 thereof is displaced from the axis of rotation 48 of the shaft. The centre of mass of the weight is therefore displaced relative to the axis of rotation 48, resulting in an uneven distribution of weight about the axis of rotation 48 of the shaft 46 of the motor. This uneven distribution of weight causes a shaking or vibrating effect when the shaft is rotated and thereby imparts shaking and vibrating movement to the handle portion 14 when the vibrator 34 is actuated.

Figure 3:
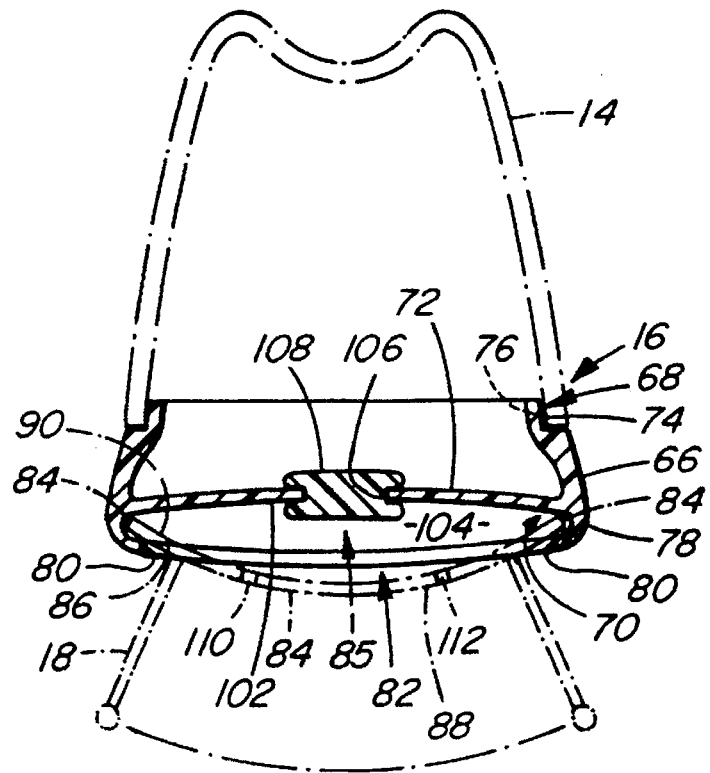
FIG. 3 is a cross sectional view of a rigid member of the apparatus shown in FIG. 1.

Referring to FIG. 3, the container portion 16 includes a rigid member 66 having a handle mounting portion is for connecting the handle portion (14 in FIGS. 1 and 2) to the rigid member, a tine mounting portion 70 for mounting the tines 18 to the rigid member and a rigid wall portion 72 separating the handle mounting portion 68 from the tine mounting portion 70. The tine mounting portion 70 and the handle mounting portion 68 are disposed on opposite sides of the rigid member 66 and therefore the handle portion 14 and tines 18 project in opposite directions.

The handle mounting portion includes a first tapered wall 74 disposed generally at right angles to the rigid wall portion 72. The handle portion 14 has a complementary tapered perimeter marginal wall portion 76 for cooperating with the first tapered wall 74 to frictionally removably secure the handle portion 14 to the rigid member 66.

The tine mounting portion 70 includes a second tapered wall portion 78 extending generally diametrically opposite the first tapered wall 74 and having an inwardly projecting marginal lip portion so defining a generally oval shaped opening 82. The marginal lip portion 80 acts as a holder for holding a perimeter edge 84 of a resilient flexible sheet member 86 to which the tines 18 are secured.

Figure 4:
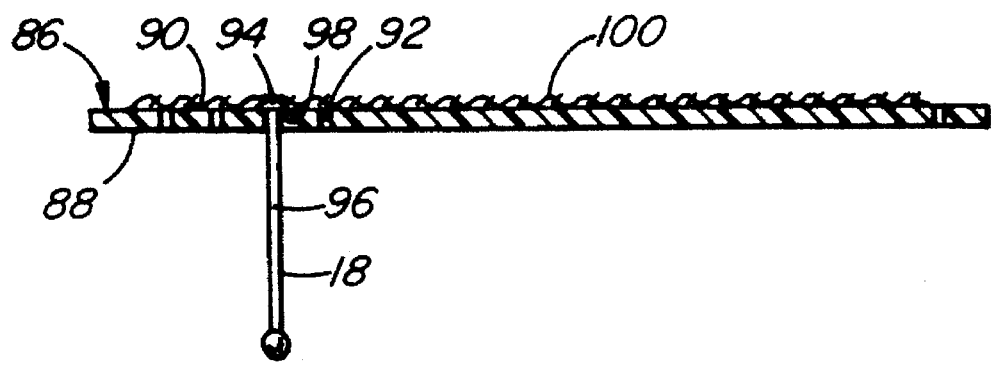
FIG. 4 is a cross sectional view of a flexible sheet member of the apparatus shown in FIG. 1.

Referring to FIG. 4, the flexible sheet member 86 is formed from a piece of sheet rubber having a thickness of approximately 1/16 inches (approx. 1.6 mm). The sheet member 86 has first and second surfaces 88 and 90 disposed on opposite sides thereof, with a plurality of tine mounting openings 92 appropriately sized for tightly receiving and holding respective end portions of respective tines 18 such that the tines generally project generally at right angles to the first surface 88. Each tine has a head portion 94 and a shaft portion 96, the shaft portion being received through a respective tine, mounting opening 92 and the head portion 94 interfering with a marginal portion 98 surrounding the tine mounting opening 92 to prevent the tine from being pulled through the sheet member 86. A fabric mesh member 100 is adhesively secured to the second surface 90, over the head portions 94 of the tines 18, to further secure the tines 18 to the sheet member 86 and to prevent the tines 18 from being pushed back through the sheet member 86.

Figure 5:
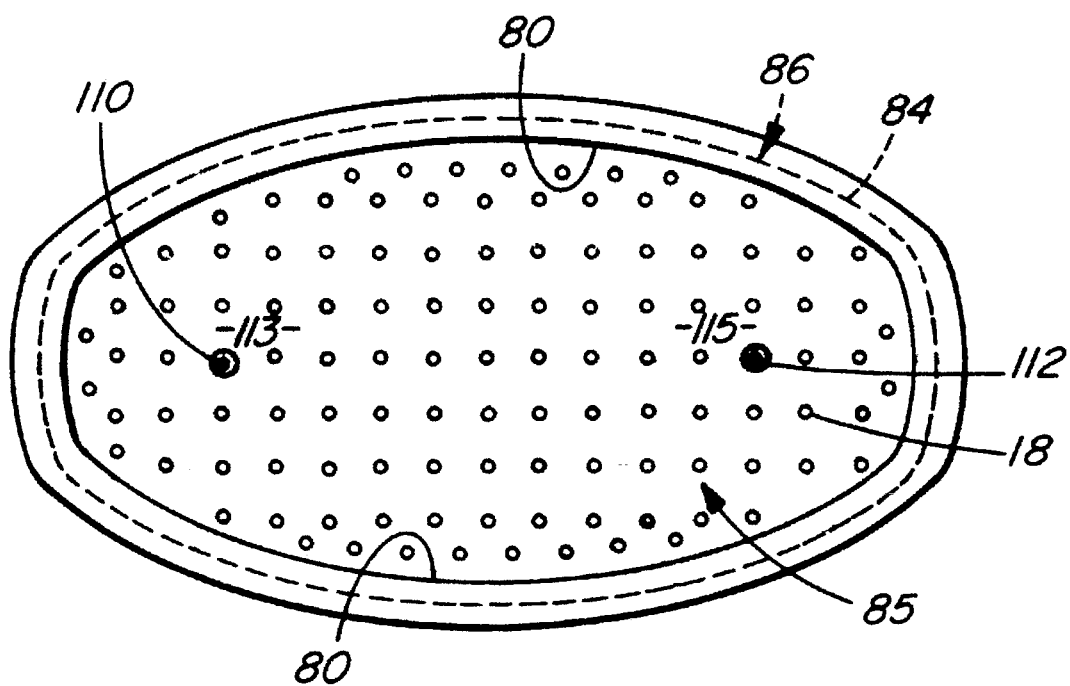
FIG. 5 is a bottom view of the apparatus shown in FIG. 1.

Referring to FIG. 5, the flexible sheet member 86 is oval shaped and is complementary to and slightly larger than the opening 85 defined by the marginal lip portions 80 Referring to FIG. 3, when the perimeter edge 84 is inserted into the opening 85 such that it is held by the marginal lip portion 80, the difference in size between the flexible sheet member 86 and the opening 85 causes the first surface 88 to become slightly convex, while the second surface 90 becomes slightly concave. The second surface 90 is thus spaced apart from an oppositely disposed surface 102 of rigid wall portion 72 and a cavity 104 is formed between the second surface 90 and the oppositely disposed surface 102. This cavity 104 acts as the container and is operable to contain particulate matter such as talcum powder, particulate deodorizing powder and/or the like. A fill opening 106 is provided in the wall portion for permitting the container to be filled with particulate matter and a rubber plug 108 for sealing the fill opening 106 is provided to prevent the particulate matter from passing through the fill opening 106 when the apparatus is vibrated.

Referring to FIGS. 3 and 5 in this embodiment, first and second spaced apart, particulate matter dispensing openings 110 and 112, each having a diameter of approximately 1/16 inches (1.6 mm) are formed in the flexible sheet member 86 between a plurality of tines 18. These openings permit the passage of a small amount of particulate matter from the container to areas 113 and 115 amongst at least some of the tines 18. These openings 110 and 112 thus act as openings in the container, proximate to the tines 18, for dispensing the particulate matter amongst the tines 18. The dispensing of particulate matter amongst the tines is further enhanced when the hairbrush is vibrated by the vibrator.

Operation

Referring to FIG. 3, to use the apparatus, the user grips rigid member 66 in one hand, grips the handle portion 14 in the other hand and pulls them in opposite directions to separate the handle portion 14 from the rigid member 66. This exposes the plug 108 to the user and allows the user to peel the plug 108 from the fill opening 106 to gain access to the container 104. The User then deposits powder to be dispensed by the apparatus into the container 104. The plug 108 is then reinserted into fill opening 106 to seal the opening. The handle portion 14 and rigid member 66 are then brought together such that the complementary tapered wall portion 76 of the handle portion 14 is fractionally engaged with the first tapered wall 74 of the handle mounting portion 68. The handle portion 14 is thus secured to the rigid member Referring to FIG. 1, with the powder loaded into the container, the user actuates the switch actuator 42 which causes the motor 44 to rotate the pennies 54 and 56 whereby a vibrating action is created in the handle portion 14. This vibrating action is transmitted from the handle portion to the rigid member 66 and hence, referring to FIG. 3, the container 104 is similarly vibrated which creates a relatively constant flow of powder from the openings 110 and 112 such that the powder is dispensed in areas 113 and 115 shown in FIG. 5, between tines 18 of the hairbrush.

The apparatus is then stroked across the fur of the animal to be treated with the apparatus being drawn through the fur in the direction of the natural lay of the fur. Thus, these is no requirement to backcomb the fur.

The apparatus evenly dispenses the powder, creating a relatively even distribution of powder about the animal, avoiding areas of over concentration of powder. The animal thus is treated in a more soothing manner compared to conventional methods as the fur is not backcombed but rather smoothly combed by the apparatus in its natural direction. In addition, the vibrating action of the apparatus is imparted to the tines be which act to detangle the fur while simultaneously massaging the animal's skin while powder is being dispensed to the animal.

While specific embodiments of the invention have been described and illustrated, such embodiments should be considered illustrative of the invention only and not as limiting the invention as construed in accordance with the accompanying claims.

What is claimed is:

1. An apparatus for grooming hair, the apparatus comprising:
   a) a handle portion;
   b) a hairbrush having:
      i) a container for containing particulate matter, said container including:
         a resilient flexible sheet member having first and second surfaces disposed on opposite sides thereof and a perimeter edge; and
         a rigid member having a handle mounting portion and a tine mounting portion disposed on opposite sides of said rigid member, said handle mounting portion connecting said handle portion to said rigid member and said tine mounting portion having a holder for holding said perimeter edge of said flexible sheet member such that said first surface is convexly shaped and said second surface is concavely shaped; and ii) a plurality of tines connected to said flexible sheet member to project generally at right angles to said first surface;

c) a vibrator for vibrating said hairbrush; and d) an opening in said container, proximate to said tines, for dispensing said particulate matter amongst said tines when said hairbrush is vibrated.

2. An apparatus as claimed in claim 1 wherein said vibrator is located in said handle portion.

3. An apparatus as claimed in claim 1 wherein said vibrator includes rotating means for rotating an object about an axis, the object having an uneven distribution of weight about said axis.

4. An apparatus as claimed in claim 1 wherein said rigid member has a wall portion disposed opposite and spaced apart from said second surface said container being defined between said second surface and said wall portion.

5. An apparatus as claimed in claim 4 wherein said opening is disposed in said sheet member, between a plurality of said tines.

6. An apparatus as claimed in claim 5 wherein said wall portion is rigid and wherein said wall portion has:

a) a fill opening for receiving said particulate matter;

b) a plug for sealing said fill opening to prevent said particulate matter from passing through said opening when said hairbrush is vibrated.

7. An apparatus as claimed in claim 1 wherein said handle mounting portion includes a tapered wall portion for cooperating with said handle portion to removably secure said handle portion to said rigid member.

8. An apparatus as claimed in claim 7 wherein the means for rotating includes a motor connected to said handle portion, said motor having a rotatable shaft rotatable about an axis of rotation and a weight mounted to said shaft in a position displaced from said axis of rotation.

* * * * *